(No Model.)
J. T. BRESSLER.
ATTACHMENT FOR WHEEL HUBS.
No. 493,474. Patented Mar. 14, 1893.
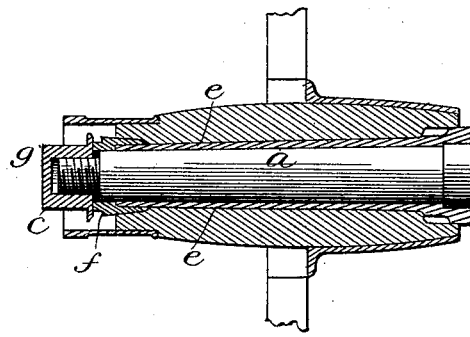
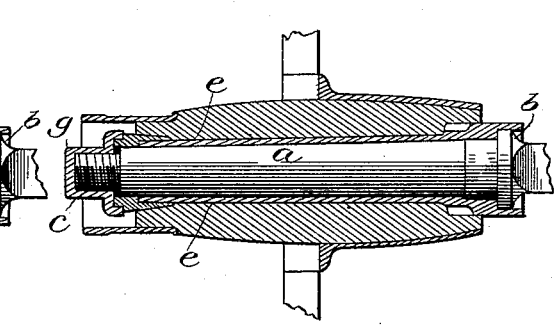
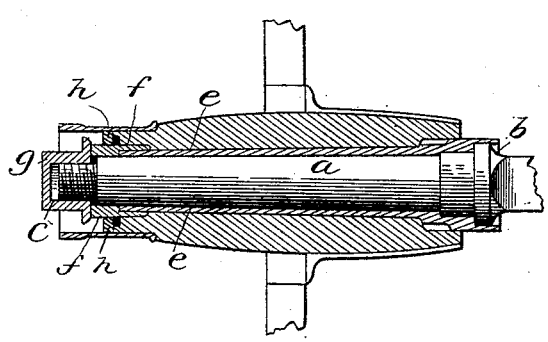
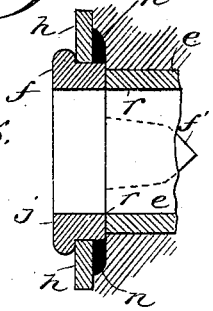
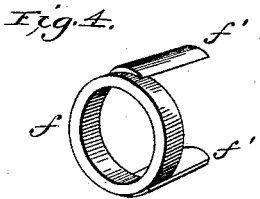
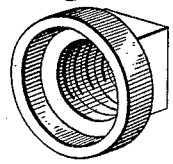
Witnesses:
Inventor:

UNITED STATES PATENT OFFICE.

JOHN TONNER BRESSLER, OF SHEPHERDSTOWN, PENNSYLVANIA.

ATTACHMENT FOR WHEEL-HUBS.

SPECIFICATION forming part of Letters Patent No. 493,474, dated March 14, 1893.

Application filed November 11, 1892. Serial No. 451,662. (No model.)

*To all whom it may concern:*

Be it known that I, JOHN TONNER BRESSLER, a citizen of the United States, and a resident of Shepherdstown, in the county of Cumberland and State of Pennsylvania, have invented certain new and useful Improvements in Hub Attachments for Preventing Wear, of which the following is a specification.

The object of my improvement is to keep the wheels of vehicles firm against the shoulder of the axle; to prevent the wear on the outer end of the box and the hub by the hub attaching nut; to exclude sand and dirt from the joint at the end of the box; and to render the box and the hub when they become worn and loose as good as new and at little cost. Such improvement I will now describe and point out by specific concluding claims.

In the accompanying drawings I have shown my improvement in: Figure 1 as used with the ordinary hub attaching-nut and as applied to the hub and to the axle. Fig. 2 is a like view showing the use of a face-ring with the pronged-ring or washer to cover the worn end of a hub, when the device is applied to take up lost motion in a worn box and hub; and Fig. 3 is a like view showing the use of a rimmed or flanged-nut. Fig. 4 shows the pronged-ring which is fixed on the end of the hub in contact with the end of the box. Fig. 5 shows the pronged-ring when made with a rim for use with a facing-ring as shown in Fig. 2. Fig. 6 shows a section of the pronged and facing rings as applied to a worn hub and box; and Fig. 7 shows the rim or flanged-nut for use with the pronged-ring shown in Fig. 4.

Referring to these drawings $a$ is the arm of the axle; $b$ its shoulder at the inner end of the hub, and $c$ is the screw-stem for the axle attaching nut $g$, and $e$ is the hub box; these parts being of the construction now generally used.

The axle-arm projects beyond the end of the hub about a quarter of an inch and on this projecting end I fit a ring $f$ having two or more prongs or tines $f'$ which I prefer to make in the form of wedges and which project from the circumference of the ring so as to be driven into the end of the hub just outside of the box. These prongs or tines are to fasten the ring as a fixed part of the hub and to prevent it from turning independent of the hub. As thus secured this ring forms an extension of the box and an inner hub-band against which the hub attaching-nut $g$ is driven and works so that the wear is upon the nut and the outer side of the pronged-ring, which wear can be taken up by the nut or by washers placed between it and the ring. The employment of this pronged ring therefore protects both the hub and the box from wear by the hub attaching-nut. It also protects the box from dust. The prongs are about one and a half inches long and a half inch wide, while the ring is made to suit the size of the axle and the hub. The prongs project from the circumference of the ring but do not extend its full width as seen in Figs. 1 and 4, so that it can be used with a plain nut as seen in Figs. 1 and 2, or with a rimmed or flanged-nut as seen in Figs. 3 and 7.

In Fig. 5 I have shown the facing ring $h$ having inner edge notches $i\ i$ to fit over the prongs against the rim $j$ of the ring and against the end of the hub, while the ring is driven against the worn end of the hub, as seen in Fig. 6, to take up the lost motion from wear and cause the wheel to run firmly upon the axle-arm. In this use of the wear-ring its rim serves to secure the face ring firmly against the end of the hub and thus cover the excavation worn out by the nut, as seen at $n$ in Fig. 6. The rimmed pronged-ring I therefore use for worn hubs and boxes, while the non-rimmed pronged-ring I use for unworn hubs and boxes, in either case the object of the pronged-ring is to keep the wheel close against the shoulder of the axle-arm and prevent wear upon the box or upon the end of the hub.

In Fig. 6 I have shown the end of the box at $r$ and the end of the hub at $n$ as having been worn away and the pronged-ring driven into the hub against the worn end of the box and the ring $h$ clamped by the rim of the nut against the end of the hub to cover the excavation worn away by the friction of the nut as used in the common hub nut fastening. It is especially in such application that the importance of my improvement is seen, because it makes an old worn hub-attaching-device as good as new at comparatively trifling cost. In driving the prongs of the wearing-ring into the end of the hub outside of the box, the ring would be liable to be driven in unequally so that its bearing on the end of the box would not be true. To prevent this and to prevent the unequal wear of the pronged ring, I support my ring solidly upon the axle-arm, while being driven into the hub, and this solid support keeps the ring in a true bearing against the hub-box and against the fastening nut.

I claim as my improvement—

1. In a hub attaching device, the ring $f$ having the prongs standing in the axial line and the rim $j$ standing at right angles to such line, combined with a facing-ring $h$ adapted to engage said rim, substantially as described.

2. In a hub attaching device, the ring $f$ having the prongs, in combination with a facing-ring and means on the outer end of said pronged-ring for securing said facing-ring against the end of the hub, substantially as described.

3. In a hub attaching device, the combination with the pronged-ring having the rim $j$, of the facing-ring $h$ having the notches $i\ i$ in the edge of its central hole corresponding with and engaging the ring-prongs, the said facing ring fitting upon the said pronged-ring against its rim, as shown and for the purpose described.

In testimony whereof I have hereunto signed this specification in the presence of witnesses.

JOHN TONNER BRESSLER.

Witnesses:
R. D. CASTERLINE,
J. C. NESBIT.